US006216263B1

(12) United States Patent
Elam (10) Patent No.: US 6,216,263 B1
(45) Date of Patent: Apr. 10, 2001

(54) RECEIVER APPARATUS AND METHOD FOR PROVIDING CONDITIONAL ACCESS TO RECEIVED TELEVISON PROGRAMS

(75) Inventor: Carl M. Elam, Perry Hall, MD (US)

(73) Assignee: Soundview Technologies Incorporated, Greenwich, CT (US)

( * ) Notice: Subject to any disclaimer, the term of this patent is extended or adjusted under 35 U.S.C. 154(b) by 0 days.

(21) Appl. No.: 09/066,215

(22) Filed: Apr. 24, 1998

(51) Int. Cl.$^7$ .............................. H04N 7/16; H04N 7/10
(52) U.S. Cl. ............................................. 725/28; 725/151
(58) Field of Search ..................... 348/5.5, 9, 10; 455/6.2, 6.3

(56) References Cited

U.S. PATENT DOCUMENTS

| | | |
|---|---|---|
| 3,673,318 | 6/1972 | Olsen et al. . |
| 3,789,137 | 1/1974 | Newell . |
| 3,891,792 | 6/1975 | Kimura . |
| 3,919,462 | 11/1975 | Hartung et al. . |
| 4,093,825 | 6/1978 | Gladstone et al. . |
| 4,159,480 | 6/1979 | Tachi . |
| 4,206,440 | 6/1980 | Doi et al. . |
| 4,215,335 | 7/1980 | Doi et al. . |
| 4,245,245 | 1/1981 | Matsumoto et al. . |
| 4,280,139 | 7/1981 | Mogi et al. . |
| 4,283,787 | 8/1981 | Chambers . |
| 4,306,605 | 12/1981 | Weidler et al. . |
| 4,333,110 * | 6/1982 | Faeber et al. .................. 348/632 |
| 4,347,619 | 8/1982 | Dakin et al. . |

(List continued on next page.)

OTHER PUBLICATIONS

Adaptation of U.K. Teletext System For 525/60 Operation, Aug. 1980, *IEEE Transactions on Consumer Electronics* vol. CE–26, pp. 587–599.

Annex B, C, D, Aug. 1980, *IEEE Transactions on Consumer Electronics* vol. CE–26, pp. 552–554, 279–287 and 527–554.

Telesoftware–Value Added Teletext, (Aug. 1980) No. 3 *IEEE Transactions on Consumer Electronics* vol. CE–26, New York USA.

Data Transmission Format *TeleCaption.*

A Vertical Interval: A General Purpose Transmission Path Sep. 1971 *IEEE Transactions on Broadcasting* pp. 77–82.

*Primary Examiner*—John W. Miller
(74) *Attorney, Agent, or Firm*—Cook, Alex, McFarron, Mauzo, Cummings & Mehler (57) ABSTRACT

A television receiver is shown and described for receiving and displaying to a viewer a program content rated television program transmission which includes a data signal. Within the receiver the program content rating, which preferably conforms to the U.S. standard age-based rating and content categories, is derived from the data signal. A viewing control circuit, in response to user inputs, stores one or more program rating viewing authorizations. The derived program rating is compared with the stored viewing authorization for the viewer to develop a blanking control signal. A signal integrity monitoring circuit monitors the signal to provide a rating default control signal in the absence of a reliable program rating signal after a predetermined delay. A blanking circuit, responsive to the blanking control signal and the rating default signal, blanks the program video and mutes the program audio in the event the program level is not authorized to the viewer or the program content rating is not reliable. The rating default control signal may, in one operating mode of the receiver, be applied directly to the blanking circuit to blank the program, or, in another operating mode of the receiver, may, depending on the stored viewing authorization, inhibit the blanking of the program by the first control signal and the rating default signal to allow viewing of the program. In a preferred embodiment, the monitoring circuit monitors the parity error rate in the digital data signal component and provides the control signal when the parity error rate exceeds a predetermined threshold level.

35 Claims, 4 Drawing Sheets

U.S. PATENT DOCUMENTS

| | | |
|---|---|---|
| 4,349,904 | 9/1982 | Jannssen et al. . |
| 4,354,201 | 10/1982 | Sechet et al. . |
| 4,426,698 | 1/1984 | Pargee, Jr. . |
| 4,488,179 | 12/1984 | Krüger et al. . |
| 4,554,584 | 11/1985 | Elam et al. . |
| 4,605,964 * | 8/1986 | Chard ................................... 348/401 |
| 5,751,335 * | 5/1998 | Shintani ................................ 348/5.5 |
| 5,874,992 * | 2/1999 | Caporizzo ............................ 348/192 |

* cited by examiner

RECEIVER APPARATUS AND METHOD FOR PROVIDING CONDITIONAL ACCESS TO RECEIVED TELEVISON PROGRAMS

BACKGROUND OF THE INVENTION

The present invention relates generally to television broadcast systems, and more particularly to analog or digital television broadcast receivers and methods wherein program content rating data transmitted concurrently with a television program signal is utilized to provide parental control over the viewing by children of television programs broadcast over the system.

Various systems and receivers have been proposed for conveying program rating data along with a conventional NTSC television transmission. In particular, U.S. Pat. No. 4,554,584 to Carl Elam et al. describes a system wherein program content rating data is transmitted as digital codes along with conventional closed captioning data as part of a data component on line 21 in the vertical blanking interval. A receiver is described wherein this information is compared with stored user-selected program limits or viewing authorizations and the program is selectively blanked if it is not authorized by the stored selection criteria.

One problem which may arise in the implementation of the system described in U.S. Pat. No. 4,554,584 is that in certain cases the received television program signal may be so weak or degraded by interference as to prevent the decoding of reliable closed captioning data or program content rating data. Under the latter circumstance, the receiver may ultimately provide access to an unauthorized program, or deny access to an authorized program. Moreover, the parental control afforded by the receiver of the Elam et al. patent could potentially be defeated by a viewer weakening the television program signal sufficiently, as by disconnecting a portion of the antenna, so that reliable program content rating characters in a received, unauthorized program are not derived by the receiver for comparison with the stored viewing authorizations and the receiver defaults to a viewing enabled state.

The present invention is directed to an improvement in the system proposed by Elam et al. wherein in an analog or digital television receiver the integrity of a data signal transmitted with the television program transmission is monitored to determine whether the data signal is being reliably received, and hence whether reliable rating characters are being received. In the event the integrity of the data signal falls below an acceptable threshold level, the program is either blanked, or, depending on the operating mode of the receiver, a determination is made whether to blank depending on either 1) the viewing authorization then in effect for the viewer, or 2) whether a default to view or default to blank authorization has been stored for the viewer.

Accordingly, it is a general object of the present invention to provide a television receiver which provides conditional access to received television programs.

It is a more specific object of the present invention to provide an analog or digital television receiver which provides conditional access to received television programs depending on the presence of reliable rating data in the received program signal.

It is a more specific object of the present invention to provide an analog or digital television receiver which provides conditional access to received television programs depending on the presence of reliable rating data in the received program signal and on the applicable viewer authorization then in effect.

It is a still more specific object of the present invention to provide an analog or digital television receiver wherein the presence of reliable program rating data is confirmed by monitoring parity error rate in a digital data signal component of the received television broadcast signal.

SUMMARY OF THE INVENTION

The invention is directed to a television receiver for receiving and displaying to a viewer a television program transmission signal which includes a data signal and a program content rating signal indicative of the program content rating of the received television transmission. The receiver comprises circuit means for separating the data signal and the program content rating signal from the television program signal, a rating derivation circuit for deriving the program rating from the program content rating signal, user selection means responsive to user inputs for storing program rating viewing authorizations for one or more viewers, means for comparing the derived program rating with the stored viewing authorization applicable to the viewer to develop a blanking control signal in the event the viewer is not authorized to view the program, a monitoring circuit for monitoring the integrity of at least a portion of the data signal, the monitoring circuit providing a rating default control signal upon the integrity of the portion of the data signal falling below a predetermined threshold level, and a blanking circuit responsive to the blanking control signal and the rating default control signal for blanking the program in the event the program rating level is not authorized to the viewer or the integrity of the portion of the data signal falls below the predetermined threshold level.

The invention is further directed to a television receiver for receiving and displaying to a viewer a television program transmission signal including a data signal and a program content rating signal indicative of the program content rating of the received television transmission. The receiver comprises circuit means for separating the data signal from the television program transmission signal, a rating derivation circuit for deriving the program rating signal component from the digital data signal, a rating derivation circuit for deriving the program rating from the program content rating signal, user selection means responsive to user inputs for storing program rating viewing authorizations for one or more viewers including default to view authorizations, means for comparing the derived program rating with the stored viewing authorization applicable to the viewer to develop a blanking control signal in the event the viewer is not authorized to view the program, a monitoring circuit for monitoring the integrity of at least a portion of the data signal, the monitoring circuit providing a rating default control signal upon the integrity of the portion of the data signal falling below a predetermined threshold level, a blanking circuit responsive to the blanking control signal and the rating default control signal for blanking the program video in the event the program rating level is not authorized to the viewer or the integrity of the data signal falls below the threshold level, and means responsive to the rating default control signal and the stored program rating viewing authorizations for inhibiting the blanking of the program by the blanking control signal and the rating default control signal when the applicable stored viewing authorization includes a default to view rating for the viewer when signal integrity falls below the threshold level.

The invention is further directed to a television receiver for receiving and displaying to a viewer a television program transmission signal including a digital data signal which includes a closed captioning signal component and a program rating signal component indicative of the program content rating of the received television transmission. The receiver comprises circuit means for separating the digital data signal from the television program signal, a closed captioning derivation circuit for deriving the closed captioning signal component from the data signal, a rating derivation circuit for separating the program content rating signal component from the closed captioning signal component, a rating derivation circuit for deriving the program rating from the program content rating signal, user selection means responsive to user inputs for storing program rating viewing authorizations for one or more viewers, means for comparing the derived program rating with the stored viewing authorization applicable to the viewers to develop a blanking control signal in the event the viewer is not authorized to view the program, a monitoring circuit for monitoring the parity error rate in at least a portion of the digital data signal including the closed captioning signal component, the monitoring circuit providing a rating default control signal upon the parity error rate in the portion of the digital data signal exceeding a predetermined threshold level, and a blanking circuit responsive to the blanking control signal and the rate default control signal for blanking the program in the event the program rating level is not authorized to the viewer or the parity error rate exceeds said threshold level.

The invention is further directed to a television receiver for receiving and displaying to a viewer a television program transmission signal including a digital data signal which includes-a closed captioning signal component and a program rating signal component indicative of the program content rating of the received television transmission. The receiver comprises circuit means for separating the digital data signal from the television program transmission signal, a closed captioning derivation circuit for deriving the closed captioning signal component from the data signal, a rating derivation circuit for separating the program content rating signal from the closed captioning signal component, a rating derivation circuit for deriving the program rating from the program content rating signal, user selection means responsive to user inputs for storing program rating viewing authorizations including default to view authorizations for one or more viewers, means for comparing the derived program rating with the stored viewing authorization applicable to the viewer to develop a blanking control signal in the event the viewer is not authorized to view the program, a monitoring circuit for monitoring the parity error rate of at least a portion of the data signal including the closed captioning signal component, the monitoring circuit providing a rating default control signal upon the integrity of the portion of the data signal falling below a predetermined threshold level, and a blanking circuit responsive to the blanking control signal and the default control signal for blanking the program in the event the program rating level is not authorized to the viewer or said parity error exceeds the threshold level, and means responsive to the closed captioning control signal and the stored program rating viewing authorizations for inhibiting the blanking of the program by the blanking control signal and the rating default control signal when the applicable stored viewing authorization includes a default to view rating for the viewer when signal integrity falls below said threshold level.

The invention is further directed, in a television receiver for receiving and displaying to a viewer a television program transmission signal including a data signal and a program content rating signal indicative of the program content rating of the received transmission, to the method of controlling access to the program to selected viewers comprising the steps of storing viewer-specific program rating viewing authorizations, separating the data component from the television program signal, separating the program content rating signal from the television program signal, deriving the program rating from the program content rating signal, comparing the derived program rating with the applicable stored viewing authorization and developing a blanking control signal in the event viewing is not authorized, monitoring the integrity of the data signal and developing a rating default control signal in the event the integrity falls below a predetermined threshold level, and blanking the program upon the occurrence of either the blanking control signal or the rating default control signal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENTS

Figure 1:
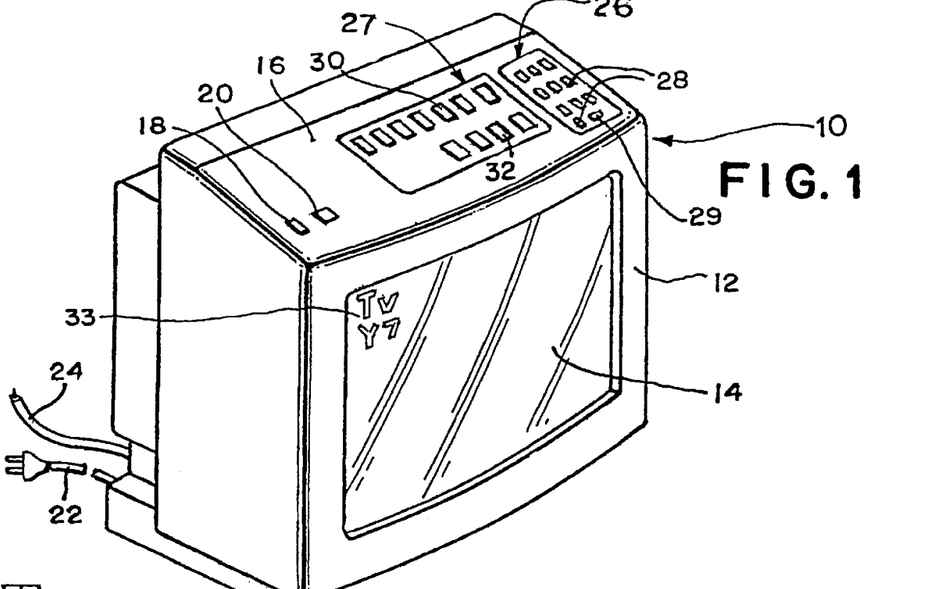
FIG. 1 is a perspective view of a television receiver incorporating circuitry which provides conditional access to a received television program in accordance with the invention.

Referring to the drawings, and particularly to FIG. 1, a television receiver 10 constructed in accordance with the invention for receiving analog or digital television broadcasts which include a data signal component within which a program rating is conveyed includes a housing 12 and a conventional cathode ray tube 14 for viewing a selected television program. The housing 12 may include a top panel 16 on which various user-actuable controls, including an ON-OFF switch 18 and a volume control 20 are located. A conventional AC line cord 22 provides operating power and a coaxial cable 24 provides for connection to a cable system or an antenna.

To provide controlled access to certain program rating categories, television receiver 10 incorporates conditional access circuitry which compares the program rating of a received television program with a stored viewer authorization table. User inputs to this circuitry may be provided by a keypad 26 and a combined rating display and designation panel 27 located on top panel 16. Keypad 26, which is utilized to input numerical data, such as the personal identification number (PIN) of a user, may be conventional in function and design and consist of ten 0–9 numerical keys 28 and an ENTER key 29.

Designation panel 27, which is used to input program ratings associated with a particular viewer PIN, may consist of seven lighted push-button switches 30 which when depressed designate respective program age-based ratings, and four lighted push-button switches 32, which when depressed designate respective program content categories associated with the program ratings. Push button switches 30 and 32 may, in addition, light in one of two or more colors to indicate program status. For example, a switch may light green to indicate which program ratings and categories are authorized, and red to indicate which program ratings and categories are not authorized. Reference is made to the copending application of David Schmidt, application Ser. No. 09/003,729, filed Jul. 7, 1998, for a detailed description of the rating system illustrated herein and various alternate rating designation and display systems.

It will be appreciated that the functions accomplished by keypad 26 and designation panel 27 can be accomplished on-screen with the use of a remote control similar to that commonly in use for channel selection. In the event of such an on-screen implementation, keypad 26 and designation panel 27 can be omitted. The screen display, in one form, may consist of colored indicators arranged as on designation panel 28 and located in one corner of the viewing screen. The screen indications may be in view only following a program change or when a viewing authorization is being added or deleted, so as not to unnecessarily interfere with viewing of the program.

The seven lighted pushbutton switches 30 preferably correspond to the seven industry standard program age-based rating designations (e.g., TV-Y, TV-Y7, TV-Y7-FV, TV-G, TV-PG, TV-14, TV-MA), and the four lighted push-button switches 32 preferably correspond to one of the standard program content categories (e.g. sex, violence, dialogue, language) used in rating the television program. A not rated (not rated) rating designation may also be included. However, it will be appreciated that the access control system of the invention is applicable to other rating protocols having a greater or lesser number of program rating designations and content categories.

Figure 2:
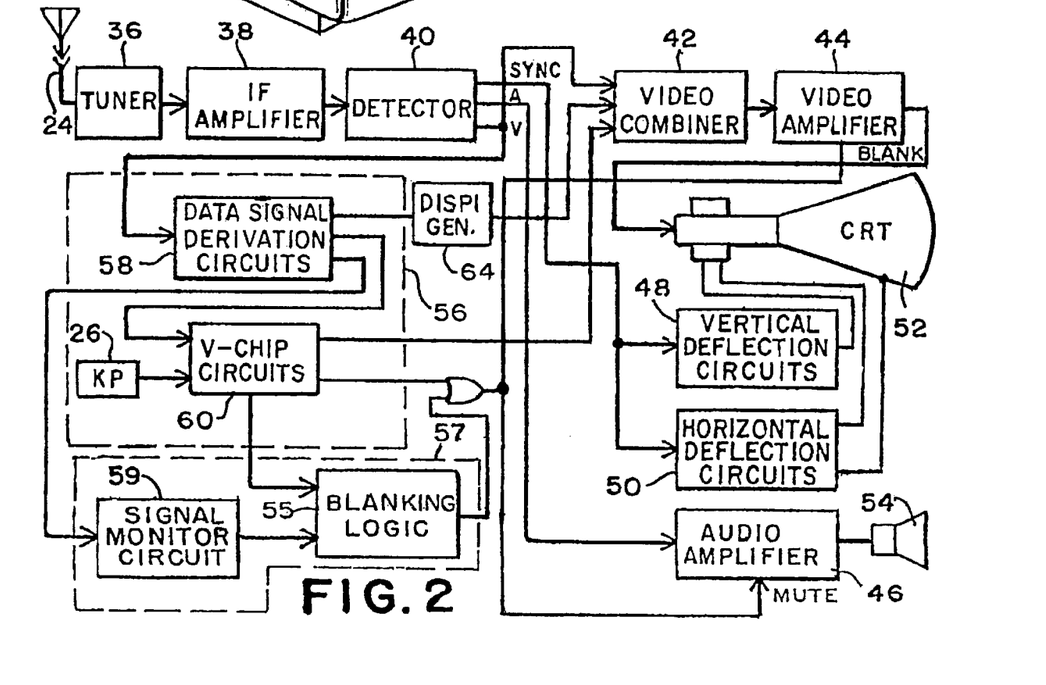
FIG. 2 is a simplified functional block diagram of the circuitry of the television receiver of FIG. 1.

Referring to FIG. 2, television receiver 12, in accordance with conventional practice, includes a tuner 36, an IF amplifier 38, a demodulator and detector 40, a video combiner 42, a video amplifier 44, an audio amplifier 46, vertical deflection circuits 48 and horizontal deflection circuits 50. Video amplifier 44 provides drive signals for a conventional cathode ray tube 52, which in accordance with conventional practice receives high voltage from horizontal deflection circuits 50. Audio amplifier 46 drives a conventional speaker 54.

The television receiver further includes a program rating and access control circuit module generally designated 56, which includes data signal derivation circuits 58, an access control or V-chip circuit 60, and keypad 26.

In operation, tuner circuit 36 selects a television channel for viewing in response to a tuning command, which may be provided either locally or by a remote control device. The sound and video components of the selected television channel appear at the output of tuner 36 at an intermediate frequency, typically 41.25 MHZ for the sound component and 45.75 MHZ for the video component. These components are amplified in IF amplifier 38 before being applied to detector-demodulator 40, wherein an audio signal, a synchronization (sync) signal and a composite video signal are derived.

The audio signal is amplified by audio amplifier 46 and utilized to drive speaker 54. The sync signal is applied to vertical deflection circuits 48 and horizontal deflection circuits 50 to synchronize the cathode ray tube scan to the received signal. The video component of the composite video signal is applied directly to video combiner 42 for amplification by video amplifier 44 and application to cathode ray tube 52. The output of detector 40 is also applied to data signal derivation circuits 58 wherein closed captioning data is derived for application to a display generator 64 and video combiner 42 and subsequent display on cathode ray tube 52. The data signal may also be applied to V-chip circuits 60 which function in accordance with the previously identified U.S. Pat. No. 4,554,584 to control access to the program depending on the program content rating and previously stored viewing authorizations.

For a U.S. standard NTSC signal, data signal derivation circuits 58, derive a digital data signal from line 21 in each field of the received television program transmission. In particular, the NTSC format for television transmission under EIA Standard 608 provides that, for each field, two bytes of closed-captioning and other digital data may be encoded on line 21 within the vertical blanking interval. This yields two eight bit ASCII characters for each field, which are separated out by circuits 58. This ASCII data, in addition to being applied to display generator 64 to generate a closed captioning display, is applied to the V-chip circuits 60 wherein program content rating data is derived and utilized for display and access control purposes. This data signal can be advantageously used to monitor the integrity of the received signal.

Data signal derivation circuits 58 also separate out closed captioning data and program content rating data from the data signal. The closed captioning data is applied to a display generator 64 wherein an appropriate video signal is generated for application to video combiner 42 and display by CRT 52. The rating data is applied to V-chip circuits 60, which generate the appropriate video signal for application to video combiner 42 to display program rating data.

V-chip circuits 60 also compare the derived program content ratings data with the applicable user-selected program viewing authorization code, which is stored in a memory within the V-chip circuits. If the comparison indicates that the received television program contains program content which exceeds the applicable viewing authorization code, i.e., the program rating is not authorized, V-chip circuits 60 provide a blanking signal to video amplifier 44 and audio amplifier 46 to prevent viewing of the television program signal.

Television receiver 10, in accordance with the invention, may further include access control circuits 57 for preventing viewing of a received television program when reliable rating data is not present, as during weak signal conditions. In particular, circuits 57 may include a signal monitoring circuit 59 which monitors the integrity of the data signal derived by data signal derivation circuits 58. The monitoring circuit 59 may, in its simplest form, monitor the integrity of the data signal, either by monitoring some attribute of the signal, such as amplitude in the case of an analog signal, or signal content, in the case of a digital signal.

In accordance with present day U.S. broadcast standards, the data signal component derived by circuits 58 is a digital data signal which contains both closed captioning and extended data, and includes an odd parity check bit on each data byte. This enables each byte to be analyzed for parity error by signal monitor circuit 59 to determine the error rate of the data signal. If the parity error rate exceeds a predetermined threshold level, the monitor circuit outputs a blanking control signal which is applied to blanking logic circuits 55, which, depending on the operating mode of the receiver, the current program rating and stored viewer authorization in V-chip circuits 60, may blank video amplifier 44 and mute audio amplifier 46 after a short predetermined delay period.

Figure 3:
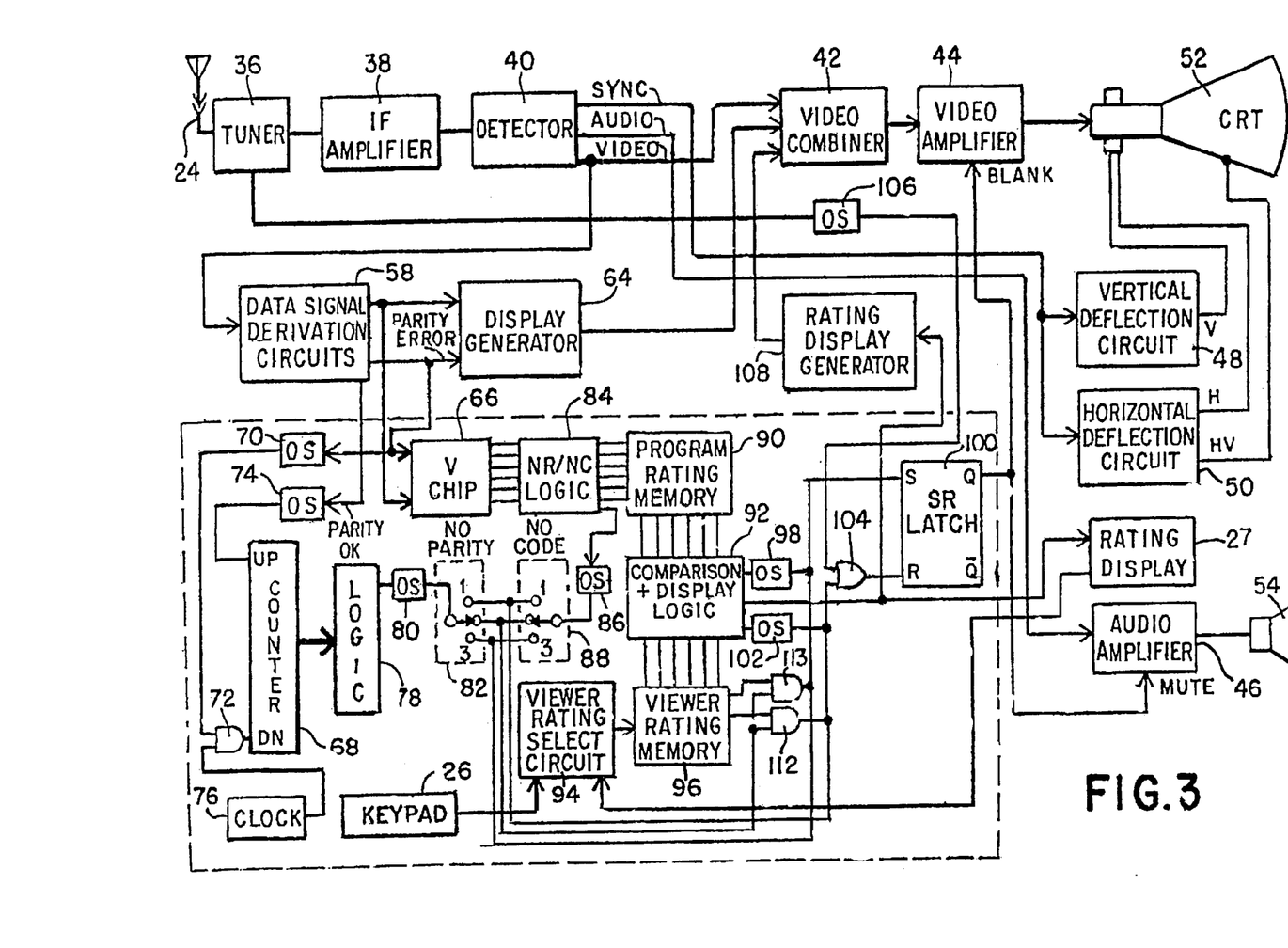
FIG. 3 is a more detailed functional block diagram of the television receiver circuitry of FIG. 2.

Referring now to FIG. 3, after being separated from the television program signal by detector 40, the composite video signal is applied to data signal derivation circuits 58 which, in addition to separating out rating data for V-chip 66 and closed captioning characters for display generator 64, determine whether the ASCII code characters in the closed captioning channel contain parity errors. In one preferred form of system which practices the present invention, within each one byte character (8 bits) transmitted under EIA Standard 608, television broadcasters designate one bit for transmission as a parity bit. This parity bit is preferably included as the most significant bit (MSB) of the character byte.

If a parity error is detected within a byte in the separated data, a PARITY ERROR signal is applied from data signal derivation circuits 58 to closed captioning display generator 64 and V-chip 66. This PARITY ERROR signal is also transmitted to a parity error rate determining circuit, which is shown in FIG. 3 to include as an asynchronous bidirectional counter 68, a one shot multivibrator 70 and AND gate 72 and a clock 76. Upon occurrence of a parity error in a data byte the PARITY ERROR signal is transmitted to the down (DN) input of counter 68 through one shot multivibrator 70 and AND gate 72, which allows a predetermined number of clock pulses, depending on the output of the clock and the duration of the one shot output, to be applied to the input with each parity error occurrence. If, however, the parity of a byte of data is confirmed, a single PARITY OK signal is transmitted to the up (UP) input of counter 68 through a one shot multivibrator 74.

When reliable closed captioning data is derived from the data channel, data signal derivation circuits 58 transmit the closed captioning data to the closed captioning display generator 64, which generates an appropriate video signal to display the closed captioning alphanumeric characters on cathode ray tube 52. If, however, a parity error is detected by the parity check circuit, a PARITY ERROR signal is supplied to closed captioning display generator 64 which prints a blank box in place of the character.

Those skilled in the art will appreciate that bidirectional counter 68 functions as a running time averaging circuit in that it may be used to indicate the ratio of parity errors to parity confirmations over a period of time. By means of associated logic circuitry counter 68 also determines whether the percentage of parity errors exceeds a predetermined error threshold. The error threshold is easily set by varying the time constant of one shot multivibrator 70 and the clock cycle of clock 76 such that counter 68 counts down a predetermined number of times for each PARITY ERROR signal received at its DN input while counting up only once for each PARITY OK signal received at its UP input.

Figure 7:
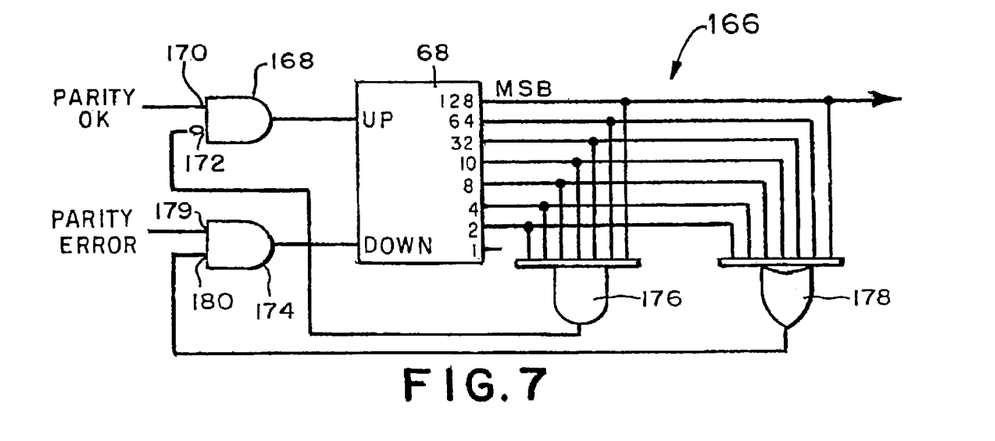
FIG. 7 is a simplified functional block diagram of a digital parity error rating detection circuit with overflow/underflow prevention circuitry which can be utilized in the circuit shown in FIG. 3.

The output of counter 68 is connected to a logic circuit 78, which is used to determine whether the counter has reached a count corresponding to the threshold has been exceeded. This is shown in FIG. 7, wherein the MSB goes logic low when the error rate is greater than the threshold. In the event that the error threshold has been exceeded, after a short predetermined delay of up to 15 seconds, or more, logic circuit 78 generates a trigger pulse for a one shot multivibrator 80 which, in turn, applies a pulse to the arm of a three position NO PARITY mode selection switch 82. In the first position of this switch, the pulse causes viewing to be enabled. In the second position of the switch viewing is enabled only for certain viewer authorizations. In the third position of switch viewing is inhibited by the pulse.

After the data separation circuits 58 separate the data within the closed captioning channel from the composite video signal, that data is applied to V-chip 66, which derives the program content rating, if any, from the data. The output of V-chip 66 is applied logic circuit 84 which determines whether a not rated (NR) rating was received or whether no program content rating was received. In the event that no rating data is received, logic circuit 84, after a short delay of up to 15 seconds, or more, applies a no code (NC) pulse to a one shot multivibrator 86, which, in turn, applies a pulse to the arm of NO CODE mode selection switch 88. In the first position of this switch, the pulse causes viewing to be enabled. In the second position of the switch viewing is enabled only for certain viewer authorizations. In the third position of switch 88 viewing is inhibited by the pulse.

In the event that a program content rating (other than not rated) is derived from the received television program signal, the NR/NC logic circuit 84 provides no output pulse and the rating signal is applied to a program rating memory circuit 90 which stores the rating. A comparison and display logic circuit 92 compares the stored rating with a stored viewing authorization code for the viewer in a viewer rating memory 96.

Before initiating a television viewing session, a television viewer inputs his or her personal identification number (PIN) into a viewer rating select circuit 94 by depressing the appropriate keys on keypad 26. Viewer rating select circuit 94 generates a viewer authorization signal which is applied to viewer rating memory circuit 96.

The stored viewing authorizations include data indicative of the program age-based ratings and content categories authorized for each television viewer, as identified by PIN entered prior to viewing. The stored authorization may further identify whether a particular viewer is authorized to view those programs which are not rated (NR) and those programs which are received by the television receiver but have program rating data that is unreliable as evidenced by an excessive parity error rate in the monitored data signal. The viewing authorizations stored within viewer rating memory circuit 96 may be changed by use of keypad 26, preferably by adult viewers following the entry of a master PIN.

The comparison and display logic circuit 92 compares the program content rating in program rating memory circuit 90 with the applicable stored viewing authorization code in memory circuit 96, and determines whether the received television program is to be blanked.

In the event the comparison and logic circuit 92 determines that the program ratings data exceeds the applicable viewing authorization code (i.e., it determines that blanking is appropriate), a pulse is applied to one shot multivibrator 98, which applies a pulse to the SET input of an active-HIGH Set/Reset (SR) latch 100, causing the Q output of that latch to apply a blanking signal to video amplifier 44 and a mute signal to audio amplifier 46.

In the event the comparison and display logic circuit 92 determines that blanking is not appropriate, a pulse is applied to one shot multivibrator 102, which in turn applies a pulse to one input of an OR gate 104. The other input of OR gate 104 is connected to receive a pulse from tuner 36 through a one shot multivibrator 106. This latter connection serves to unblank the video and unmute the audio for a few seconds after changing to a new channel. OR gate 104 applies a pulse to the RESET input of SR latch 100, causing its Q output to either remain or transition to a LOW state, thereby interrupting the blanking signal selectively applied to video amplifier 44 and the muting signal selectively applied to audio amplifier 46.

In either case, comparison and display logic circuit 92 applies the derived program content rating data to a rating display generator 108. This generator generates a video signal which is applied to video combiner 42 for incorporation into the television picture, and to rating display 27, along with the applicable viewing authorization code.

If the PARITY mode selection switch 82 and the NO CODE mode selection switch 88 are set in their first positions, the PARITY ERROR and NO CODE blanking function is not used. In the event a television program signal is received by the television receiver with no code or an excessive parity error rate, one shot multivibrator 80 and/or one shot multivibrator 86 send a signal to OR gate 104, which applies a pulse to the RESET input of SR latch 100, driving its Q output LOW and thereby unblanking video amplifier 44 and unmuting audio amplifier 46.

In the event that mode selection switches 82 and 88 are in their second positions, one shot multivibrators 80 and 86 are connected to one input of an AND gate 112 and to one input of AND gate 113. If the stored viewing authorization allows viewing with the presence of excessive parity error rate or no code conditions, the inputs to AND gate 112 are high and SR latch 100 is conditioned to allow viewing. If the stored viewing authorization does not allow viewing along with the presence of excessive parity error rate or with no code conditions, the inputs to AND gate 113 will be high and SR latch 100 will be conditioned to blank the program.

In the event that mode selection switches 82 and 88 are in their third positions one shot multivibrators 80 and 86 are connected to the SET input of SR latch 100, so that if the data derived from line 21 contains a high parity error rate or no rating data is transmitted with the television signal, a control pulse is applied to the SET input. This causes a blanking signal to be applied to video amplifier 44, which blanks cathode ray tube 52, and a muting signal to be applied to audio amplifier 46, which mutes speaker 54.

It will be appreciated that, while the NO PARITY and NO CODE mode selection switches 82 and 88 have been shown as mechanical switches in FIG. 3, the function of these switches can be provided by internal logic circuitry responsive to user entries made through keypad 26 or its on-screen equivalent. For example, NO PARITY and NO CODE modes can be selected by a viewer by depressing one or more numerical keys 28 after entering a master PIN into keypad 26. In addition, the position selected for one mode selection switch may be independent of the position selected for the other. Also, the settings of switches 82 and 88 may be under software control and may be entered in conjunction with the entry of program rating authorizations.

It will be appreciated that various alternate circuits and methods may be utilized to determine parity error rate in the digital data signal. For example, referring to FIG. 5, an analog circuit generally designated 132 is shown as a possible analog implementation of the running average circuit described with reference to FIG. 3. Analog circuit 132 may include a one shot multivibrator 134 series-connected to a resistor 136, which is series-connected to the parallel combination of a resistor 138, a capacitor 140 and an inverting operational amplifier 142.

Figure 5:
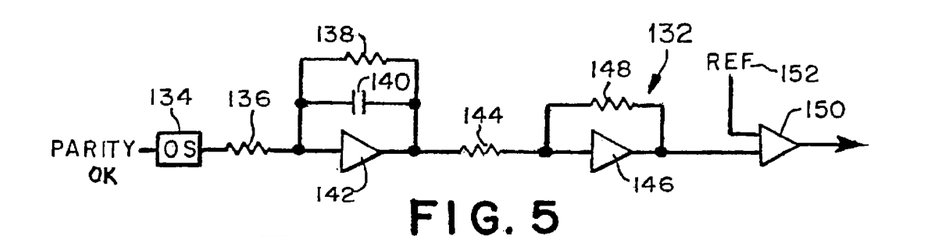
FIG. 5 is a simplified schematic diagram of an analog parity error rate detection circuit which can be used as an alternative to the digital parity error rate detection circuit shown in FIG. 3.

As will be understood by those skilled in the art, op amp 142 integrates its applied input signal for the period of time in which capacitor 140 builds up charge across its terminals. The output terminal of op amp 142, along with one terminal of resistor 138 and one terminal of capacitor 140, is connected to a resistor 144, which, in turn, is series-connected to the parallel combination of an inverting operational amplifier 146 and a feedback resistor 148. The output terminal of inverting op amp 146 is connected to an input terminal of a comparator 150, which has its other input terminal connected to a reference voltage source 152.

The PARITY OK input line applies a pulse to one shot multivibrator 134 upon the confirmation of parity in the line 21 data. The output generated by inverting operational amplifier 146 is proportional to the number of reliable character codes received over a given period of time. The reference voltage 152 may be set to an appropriate threshold level so that the output of comparator 150 will apply a voltage to NO PARITY mode selection switch 82 (see FIG. 3) when the voltage at the comparator input drops below the reference value. The threshold is easily set to a predetermined value by simply altering the values of the components included within analog circuit 132, including voltage reference 152.

Figure 6:
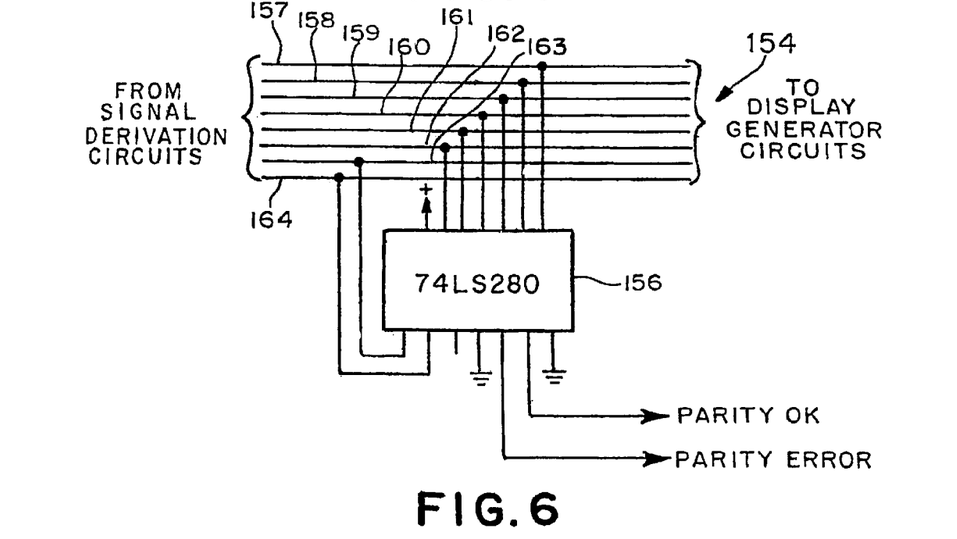
FIG. 6 is a simplified functional block diagram of a parity check circuit which can be utilized in the television receiver of FIG. 3.

Referring to FIG. 6, a conventional digital data bus generally designated 154 and having seven data lines 157–163 and a parity bit line 164 is shown connected to a conventional nine-bit parity generator/checker chip 156, available commercially as a type 74LS280 manufactured by Motorola Corporation and Texas Instruments, Inc. Chip 156 is one example of parity check circuitry which can be included within the data separation circuits 62 of FIG. 3.

Depending on the binary word present on data lines 157–163 and the parity bit present on parity line 164, parity check circuit 156 will detect an error within the parity of the data derived from line 21. If the parity of that data is confirmed, a pulse is produced at pin 6 of chip 156, indicating a PARITY OK signal is appropriate for application to the running average circuit. If a parity error is detected, a pulse is produced at pin 5 of 156, indicating a PARITY ERROR signal is appropriate for application to the running average circuit.

Referring to FIG. 7, an overflow/underflow prevention circuit generally designated 166, which may be used in conjunction with the running average circuit shown in FIG. 3 (counter 68), is shown to include an AND gate 168 having one active-HIGH input 170 and one active-LOW input 172. The overflow/underflow prevention circuit 166 further includes an AND gate 174, a seven input AND gate 176 and a seven input OR gate 178.

In operation, if a PARITY OK signal is generated by the parity check circuit, such as parity check circuit 156 shown in FIG. 6, the PARITY OK signal is applied to the input 170 of AND gate 168. If at least one of the connected outputs of counter 68 has assumed a LOW state, i.e., if the counter is not within two PARITY OK signals from overflow, a LOW signal is applied to the active-LOW input 172 of AND gate 168 and the voltage signal applied to input 170 is transmitted through that AND gate to the UP input of counter 68, causing the binary number represented by the output of the counter to increase by one. Once each connected output of counter 68 (except the least significant bit) has assumed a HIGH state, a HIGH logic state is applied to the active-LOW input 172 of AND gate 168, which inhibits any subsequent PARITY OK signal from being applied to the UP input pin of the counter until the potential overflow condition no longer exists.

Conversely, when a PARITY ERROR signal is generated by the parity check circuit, it is applied to the input 179 of AND gate 174. As long as at least one of the connected outputs of counter 68 has assumed a HIGH state, i.e., if the counter is not within two PARITY ERROR signals from underflow, a HIGH signal is applied to input 180 of AND gate 174 and the signal applied to input 179 is transmitted through the gate to the DN input of counter 68, causing the output of the counter to decrease by one. Once each connected output pin of counter 68 (except the least significant bit) has assumed a LOW state, a LOW logic state is applied to the input 180 of AND gate 174 and that gate inhibits any subsequent PARITY ERROR signals from being applied to the DN pin of the counter until the potential underflow condition no longer exists.

Figure 4:
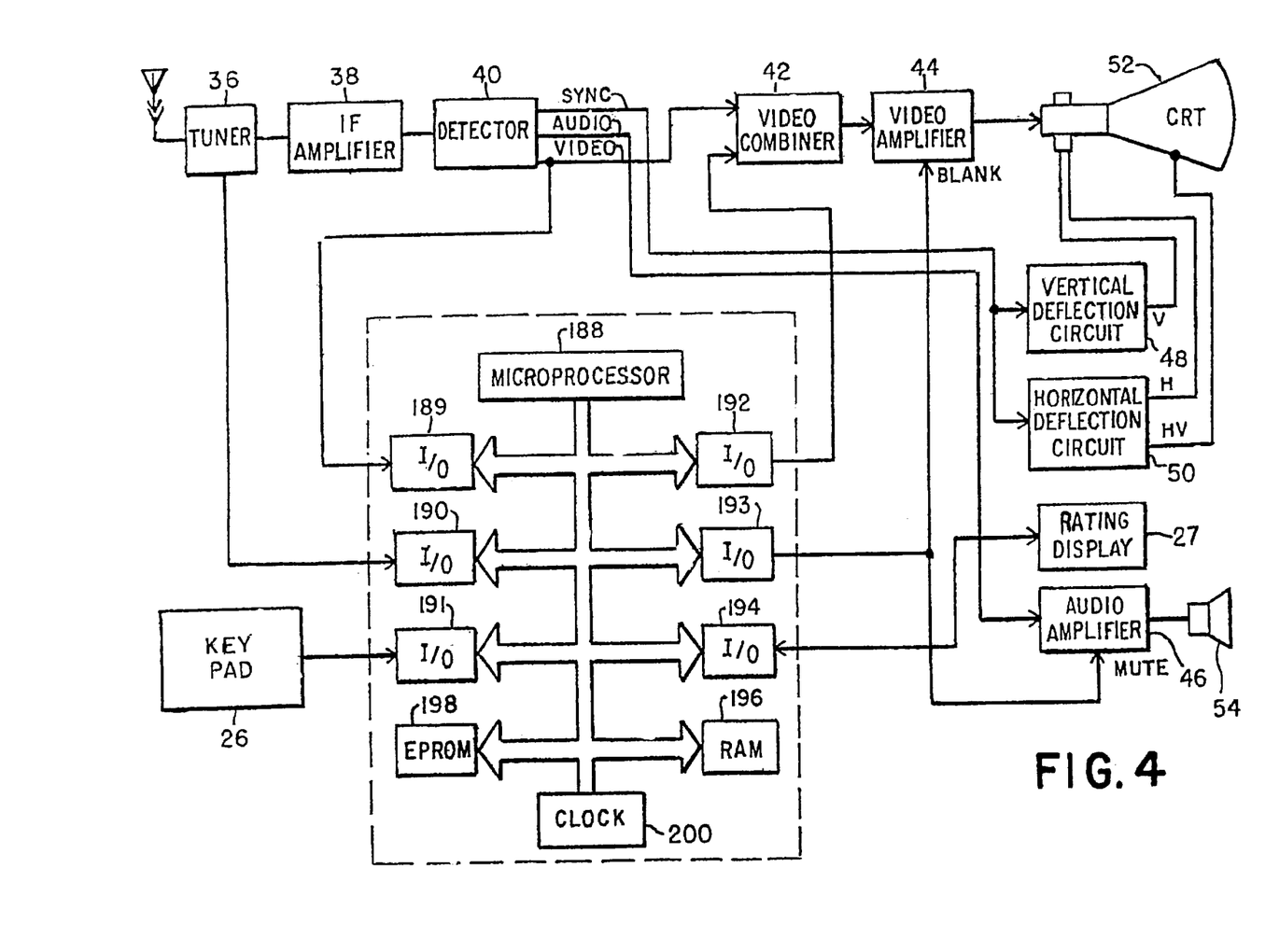
FIG. 4 is a simplified functional block diagram showing a microprocessor implementation of the television receiver circuitry of FIG. 3.

Referring to FIG. 4, the receiver circuits for television receiver 12, shown in discrete form in FIG. 3, can be advantageously constructed utilizing a conventional microprocessor. In particular, a microprocessor 188 may be provided having input/output ports 189–194 coupled to detector 40, tuner 36, keypad 22, video combiner 42, video amplifier 44 and audio amplifier 46, and rating display 27, respectively. Operating instructions stored internally in read only memory (ROM) 198 cause microprocessor 118 to perform the closed captioning, blanking, muting, parity checking, comparing, and logic functions, among others, described in conjunction with FIG. 3. A random access memory (RAM) 196 is included for storing data and a clock 200 is included for conventional synchronization purposes.

Microprocessor 188 may be programmed to perform the previously described viewing access control functions by one skilled in the programming art using conventional programming techniques.

While shown in conjunction with an analog television receiver, it will be appreciated that the television program access control system and apparatus of the invention finds equal utility in a digital television transmission system and receiver wherein one or more components of the digital data stream can be monitored for signal integrity, such as by use of the parity error rate analysis contemplated by the invention.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A television receiver for receiving and displaying to a viewer a television program transmission signal which includes a data signal and a program content rating signal indicative of a program content rating of a received television transmission, comprising:
    circuit means for separating the data signal and the program content rating signal from the television program signal;
    a rating derivation circuit for deriving the program rating from the program content rating signal;
    a no code detection circuit for generating a no code control signal upon the detection of no program rating from the derived program content rating signal for a predetermined period of time;
    user selection means responsive to user inputs for storing program rating viewing authorizations for one or more viewers;
    means for comparing the derived program rating with the stored viewing authorization applicable to the viewer to develop a blanking control signal in the event the viewer is not authorized to view the program;
    a monitoring circuit for monitoring the integrity of at least a portion of said data signal, said monitoring circuit providing a blanking control signal upon the integrity of said portion of said data signal falling below a predetermined threshold level;
    a blanking circuit responsive to said blanking control signals and said no code control signal for blanking the program in the event the program rating level is not authorized to the viewer or said integrity of said portion of said data signal falls below said predetermined threshold level or said program rating is not detected for a predetermined period of time.

2. A television receiver as defined in claim 1 wherein said data signal is a digital data signal and said monitoring circuit monitors the parity error rate in said portion of said digital data signal and provides said rating default control signal upon said parity error rate in said portion exceeding a predetermined threshold.

3. A television receiver as defined in claim 2 wherein said television program transmission signal comprises an NTSC signal and said portion of said data signal includes a digital closed captioning signal.

4. A television receiver as defined in claim 3 wherein said monitoring circuit monitors the parity error rate in said portion of said digital closed captioning signal and provides said rating default control signal upon said parity error rate exceeding a predetermined threshold level.

5. A television receiver as defined in claim 4 wherein said monitoring circuit includes bidirectional counting means, said counting means counting in one direction upon occurrence of parity errors, and in the other direction upon occurrence of parity confirmations, said threshold level being defined by a predetermined count in said counting means.

6. A television receiver as defined in claim 5 wherein multiple pulses are applied to said counting means upon occurrence of a single parity error.

7. A television receiver as defined in claim 3 wherein said digital data signal is transmitted in two portions, one portion of said signal being contained in field 1 and the other portion being contained in field 2 of said signal.

8. A television receiver as defined in claim 3 wherein said digital data signal comprises at least one character which is a non-printing character in said closed captioning signal.

9. A television receiver as defined in claim 1 wherein said blanking circuit is responsive to said rating default control signal following a predetermined delay period.

10. A television receiver for receiving and displaying to a viewer a television program transmission signal including a data signal and a program content rating signal indicative of a program content rating of a received television transmission, comprising:
    circuit means for separating the data signal from the television program transmission signal;
    a rating derivation circuit for deriving the program rating signal component from the digital data signal;
    a rating derivation circuit for deriving the program rating from the program content rating signal;

a no code detection circuit for generating a no code default control signal upon the detection of no program rating from the derived content rating signal for a predetermined period of time;

user selection means responsive to user inputs for storing program rating viewing authorizations for one or more viewers including default to view authorizations;

means for comparing the derived program rating with the stored viewing authorization applicable to the viewer to develop a blanking control signal in the event the viewer is not authorized to view the program;

a monitoring circuit for monitoring the integrity of at least a portion of said data signal, said monitoring circuit providing a blanking control signal upon the integrity of said portion of said data signal falling below a predetermined threshold level;

a blanking circuit responsive to said blanking control signals and said no code control signal for blanking the program video in the event the program rating level is not authorized to the viewer or the integrity of said data signal falls below said threshold level or said program rating is not detected for a predetermined period of time; and means responsive to said blanking control signal and said stored program rating viewing authorizations for inhibiting the blanking of said program by said blanking control signals and said no code control signal when said applicable stored viewing authorization includes a default to view rating for said viewer when signal integrity falls below said threshold level.

11. A television receiver as defined in claim 10 wherein said data signal is a digital data signal and said monitoring circuit monitors the parity error rate in said portion of said data signal and provides said rating default control signal upon said parity error rate exceeding a predetermined threshold level.

12. A television receiver as defined in claim 10 wherein said television program transmission signal comprises an NTSC signal and said portion of said data signal comprises a digital closed captioning signal.

13. A television receiver as defined in claim 12 wherein said monitor circuit monitors the parity error rate in said portion of said digital closed captioning signal and provides said rating default control signal upon said parity error rate in said portion exceeding a predetermined threshold level.

14. A television receiver as defined in claim 13 wherein said monitoring circuit includes bidirectional counting means, said counting means counting in one direction upon occurrence of parity errors, and in the other direction upon occurrence of parity confirmations, said threshold level being defined by a predetermined count in said counting means.

15. A television receiver as defined in claim 14 wherein multiple pulses are applied to said counting means upon occurrence of a parity error.

16. A television receiver as defined in claim 12 wherein said digital data signal is transmitted in two portions, one portion of said component being contained in field 1 and another portion being contained in field 2 of said signal.

17. A television receiver as defined in claim 12 wherein said digital data signal comprises at least one character which is a non-printing character in said closed captioning signal.

18. A television receiver as defined in claim 10 wherein said blanking circuit is responsive to said rating default control signal following a predetermined delay period.

19. A television receiver for receiving and displaying to a viewer a television program transmission signal including a digital data signal which includes a closed captioning signal component and a program rating signal component indicative of a program content rating of a received television transmission, comprising:

circuit means for separating the digital data signal from the television program signal;

a closed captioning derivation circuit for deriving the closed captioning signal component from the data signal;

a rating derivation circuit for separating the program content rating signal component from the closed captioning signal component;

a rating derivation circuit for deriving the program rating from the program content rating signal;

a no code detection circuit for generating a no code control signal upon the detection of no program rating from the derived program content rating signal for a predetermined period of time;

user selection means responsive to user inputs for storing program rating viewing authorizations for one or more viewers;

means for comparing the derived program rating with the stored viewing authorization applicable to the viewers to develop a blanking control signal in the event the viewer is not authorized to view the program;

a monitoring circuit for monitoring the parity error rate in at least a portion of said digital data signal including said closed captioning signal component, said monitoring circuit providing a blanking control signal upon the parity error rate in said portion of said digital data signal exceeding a predetermined threshold level; and a blanking circuit responsive to said blanking control signals and said no code control signal for blanking the program in the event the program rating level is not authorized to the viewer or said parity error rate exceeds said threshold level or said program rating is not detected for a predetermined period of time.

20. A television receiver as defined in claim 19 wherein said predetermined threshold level is a ratio of one parity error to ten parity confirmations.

21. A television receiver as defined in claim 19 wherein said monitoring circuit includes bidirectional counting means, said counting means counting in one direction upon occurrence of parity errors, and in the other direction upon occurrence of parity confirmations, said threshold level being defined by a predetermined count in said counting means.

22. A television receiver as defined in claim 19 wherein said digital data signal comprises at least one character which is a non-printing character in said closed captioning signal component.

23. A television receiver as defined in claim 19 wherein said blanking means is responsive to said rating default control signal following a predetermined delay period.

24. A television receiver for receiving and displaying to a viewer a television program transmission signal including a digital data signal which includes a closed captioning signal component and a program rating signal component indicative of a program content rating of a received television transmission, comprising:

circuit means for separating the digital data signal from the television program transmission signal;

a closed captioning derivation circuit for deriving the closed captioning signal component from the data signal;

a rating derivation circuit for separating the program content rating signal from the closed captioning signal component;

a rating derivation circuit for deriving the program rating from the program content rating signal;

a no code detection circuit for generating a no code control signal upon the detection of no program rating from the derived program content rating signal for a predetermined period of time;

user selection means responsive to user inputs for storing program rating viewing authorizations including default to view authorizations for one or more viewers;

means for comparing the derived program rating with the stored viewing authorization applicable to the viewer to develop a blanking control signal in the event the viewer is not authorized to view the program;

a monitoring circuit for monitoring the parity error rate of at least a portion of said data signal including said closed captioning signal component, said monitoring circuit providing a blanking control signal upon the integrity of said portion of said data signal falling below a predetermined threshold level;

a blanking circuit responsive to said blanking control signals and said no code control signal for blanking the program in the event the program rating level is not authorized to the viewer or said parity error exceeds said threshold level or said program rating is not detected for a predetermined period of time; and means responsive to said closed captioning control signal and said stored program rating viewing authorizations for inhibiting the blanking of said program by said blanking control signals and said no code control signal when said applicable stored viewing authorization includes a default to view rating for said viewer when signal integrity falls below said threshold level.

25. A television receiver as defined in claim 24 wherein said television program transmission signal comprises an NTSC signal and said digital data signal component comprises a digital closed captioning signal.

26. A television receiver as defined in claim 25 wherein said predetermined threshold level is a ratio of one parity error to ten parity confirmations.

27. A television receiver as defined in claim 24 wherein said monitoring circuit includes bidirectional counting means, said counting means counting in one direction upon occurrence of parity errors, and in the other direction upon occurrence of parity confirmations, said threshold level being defined by a predetermined count in said counting means.

28. A television receiver as defined in claim 25 wherein said digital data signal is transmitted in two portions, one portion of said component being contained in field 1 and another portion being contained in field 2 of said signal.

29. A television receiver as defined in claim 25 wherein said digital data component comprises at least one character which is a non-printing character in said closed captioning signal.

30. A television receiver as defined in claim 24 wherein said blanking means is responsive to said blanking control signal following a predetermined delay period.

31. In a television receiver for receiving and displaying to a viewer a television program transmission signal including a data signal and a program content rating signal indicative of a program content rating of a received transmission, the method of controlling access to the program to selected viewers comprising the steps of:

storing viewer-specific program rating viewing authorizations;

separating the data component from the television program signal;

separating the program content rating signal from the television program signal;

deriving the program rating from the program content rating signal;

comparing the derived program rating with the applicable stored viewing authorization and developing a blanking control signal in the event viewing is not authorized;

monitoring the data signal and developing a no code control signal in the event no program rating from the derived program content rating is detected for a predetermined period;

monitoring the integrity of the data signal and developing a blanking control signal in the event the integrity falls below a predetermined threshold level; and blanking the program upon the occurrence of either a blanking control signal or the no code control signal.

32. The method of controlling access to television viewing defined in claim 31 wherein said step of monitoring signal integrity comprises monitoring the parity error rate in the digital data signal and developing the rating default control signal upon the parity error rate exceeding a predetermined level.

33. The method of controlling access to television viewing defined in claim 32 including the additional steps of:

storing default to view authorizations along with the program viewing authorizations; and inhibiting the blanking of the program by the blanking control signal and the rating default signal in the event that the program rating is authorized to the viewer in the absence of reliable ratings by the stored default to view authorizations.

34. A television receiver as defined in claim 2 or 4 wherein said predetermined threshold level is a ratio of one parity error to ten parity confirmations.

35. A television receiver as defined in claim 11 or 20 wherein said predetermined threshold level is a ratio of one parity error to ten parity confirmations.

* * * * *